United States Patent
Salud et al.

(10) Patent No.: US 12,370,885 B1
(45) Date of Patent: Jul. 29, 2025

(54) PLANETARY INNER KNUCKLE

(71) Applicant: Schaeffler Technologies AG & Co. KG, Herzogenaurach (DE)

(72) Inventors: Oscar Salud, Puebla (MX); Franklin May, Puebla (MX); Ayyalraju Satyaseelan, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/655,646

(22) Filed: May 6, 2024

(51) Int. Cl.
| | |
|---|---|
| *B60K 17/04* | (2006.01) |
| *B62D 7/18* | (2006.01) |
| *F16H 1/28* | (2006.01) |
| *F16H 57/021* | (2012.01) |
| *F16H 57/029* | (2012.01) |
| *F16H 57/08* | (2006.01) |
| *F16H 57/02* | (2012.01) |

(52) U.S. Cl.
CPC ............. *B60K 17/046* (2013.01); *B62D 7/18* (2013.01); *F16H 1/28* (2013.01); *F16H 57/021* (2013.01); *F16H 57/029* (2013.01); *F16H 57/082* (2013.01); *F16H 2057/02026* (2013.01); *F16H 2057/02052* (2013.01)

(58) Field of Classification Search
CPC ........... B60K 17/046; B62D 7/18; F16H 1/28; F16H 57/021; F16H 57/029; F16H 57/082; F16H 2057/02026; F16H 2057/02052
See application file for complete search history.

(56) References Cited

U.S. PATENT DOCUMENTS

| | | | | |
|---|---|---|---|---|
| 2,936,036 | A * | 5/1960 | Norelius ............ | B60K 17/3467 475/221 |
| 4,693,699 | A * | 9/1987 | Gregerson ............... | F16J 15/54 277/912 |
| 2010/0200323 | A1* | 8/2010 | Egawa ................... | B60K 17/00 180/252 |

* cited by examiner

*Primary Examiner* — Jason D Shanske
*Assistant Examiner* — Matthew James O'Neill

(57) ABSTRACT

A planetary inner knuckle for a vehicle axle includes a housing, a sun gear, a planetary carrier and a plurality of planet gears. The housing includes a first housing portion arranged for fixing to a housing for the vehicle axle and a ring gear, rotationally fixed to the housing for the vehicle axle. The sun gear is arranged for rotationally fixing to an axle shaft for the vehicle axle. The planetary carrier includes an output hub arranged to be coaxial with the axle shaft and for rotationally fixing to an output shaft, and a plurality of planet gear shafts. Each of the plurality of planet gears is mounted on a one of the plurality of planet gear shafts and drivingly engaged with the ring gear and the sun gear. The vehicle axle is also disclosed.

12 Claims, 1 Drawing Sheet

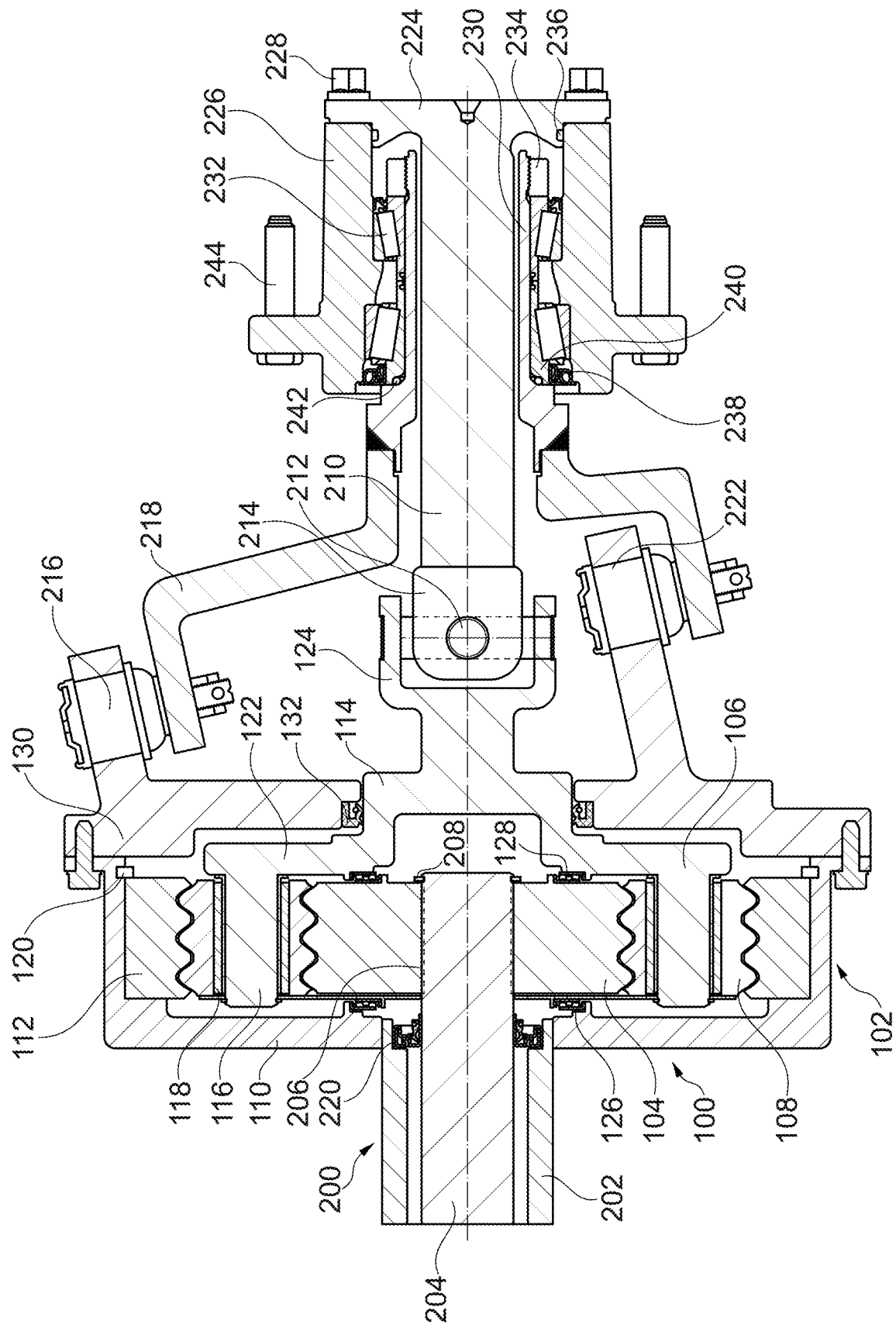

ved to the axle shaft the axle shaft based on the disclosure herein.

PLANETARY INNER KNUCKLE

TECHNICAL FIELD

The present disclosure relates generally to an axle for a vehicle, and more specifically to a planetary inner knuckle for the vehicle axle.

BACKGROUND

Front drive shafts with planetary gears are known. One example is shown and described in United States Patent Publication No. 2010/0200323 titled WORK VEHICLE to Egawa et al.

SUMMARY

Example embodiments broadly comprise a planetary inner knuckle for a vehicle axle including a housing, a sun gear, a planetary carrier and a plurality of planet gears. The housing includes a first housing portion arranged for fixing to a housing for the vehicle axle and a ring gear, rotationally fixed to the housing for the vehicle axle. The sun gear is arranged for rotationally fixing to an axle shaft for the vehicle axle. The planetary carrier includes an output hub arranged to be coaxial with the axle shaft and for rotationally fixing to an output shaft, and a plurality of planet gear shafts. Each of the plurality of planet gears is mounted on a one of the plurality of planet gear shafts and drivingly engaged with the ring gear and the sun gear.

In an example embodiment, the ring gear is a separate component fixed in the first housing portion, or integrally formed with the first housing portion from a same piece of material. In an example embodiment, the output hub includes a yoke arranged for receiving a cross of a universal joint to rotationally fix the output hub to the output shaft. In an example embodiment, the planetary inner knuckle also includes a first axial bearing supporting the sun gear on the first housing portion and a second axial bearing supporting the sun gear on the planetary carrier.

In some example embodiments, the planetary inner knuckle also includes a second housing portion fixed to the first housing portion and arranged to receive a first ball joint for a steering knuckle. In an example embodiment, the second housing portion is bolted to the first housing portion. In an example embodiment, the second housing portion is sealed to the output hub. In an example embodiment, the second housing is arranged to receive a second ball joint for the steering knuckle.

Other example embodiments broadly comprise a vehicle axle including an axle housing, an axle shaft extending through the axle housing, an output shaft arranged for fixing to a wheel for the vehicle, and a planetary knuckle. The planetary knuckle includes a housing with a first housing portion fixed to the axle housing and a ring gear rotationally fixed to the axle housing, a sun gear rotationally fixed to the axle shaft, a planetary carrier, and a plurality of planet gears. The planetary carrier includes an output hub coaxial with the axle shaft and rotationally fixed to the output shaft and a plurality of planet gear shafts. Each of the planet gears is mounted on a one of the plurality of planet gear shafts and drivingly engaged with the ring gear and the sun gear.

In an example embodiment, the vehicle axle also includes a cross of a universal joint and the cross has two pairs of coaxial shafts. The output hub has a first yoke and a first pair of the two pairs of coaxial shafts is rotatably fixed in the first yoke. The output shaft has a second yoke and a second pair of the two pairs of coaxial shafts is rotatably fixed in the second yoke.

In some example embodiments, the vehicle axle also includes a first ball joint. The housing also includes a second housing portion fixed to the first housing portion and the first ball joint is fixed in the second housing portion. In an example embodiment, the vehicle axle also includes a second ball joint fixed in the second housing portion, and a steering knuckle rotatably fixed to the first ball joint and the second ball joint. In an example embodiment, the vehicle axle also includes a first seal for sealing the axle shaft to the axle housing or the housing, and a second seal for sealing the housing to the output hub.

BRIEF DESCRIPTION OF THE DRAWINGS

The single FIGURE illustrates a cross-sectional view of a vehicle axle including a planetary inner knuckle.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The following description is made with reference to the single FIGURE. The single FIGURE illustrates a cross-sectional view of vehicle axle 200 including planetary inner knuckle 100. Planetary inner knuckle 100 includes housing 102, sun gear 104, planetary carrier 106 and planet gears 108. The housing includes housing portion 110 arranged for fixing to housing 202 for vehicle axle 200, and ring gear 112, rotationally fixed to axle housing 202. Housing portion 110 may be fixed to axle housing 202 via welding, adhesives, shrink fitting, cutting spline, or any known method of fixing metal components together, for example. Sun gear 104 is arranged for rotationally fixing to axle shaft 204 for vehicle axle 200. Gear 104 may be rotationally fixed to the axle shaft via spline connection 206, for example, allowing the sun gear to slide over the axle shaft during assembly of the axle. Sun gear 104 may be axially retained on axle shaft 204 by snap ring 208, for example.

Planetary carrier 106 includes output hub 114 and planet gear shafts 116. The output hub is coaxial with axle shaft 204 (i.e., the output hub and the axle shaft share a common rotational axis) and rotationally fixed to output shaft 210. Planet gears 108 are each mounted on one of planet gear shafts 116 (via bearings 118, for example) and drivingly engaged with the ring gear and the sun gear. By drivingly engaged, we mean that the planet gears include gear teeth that intermesh with mating gear teeth in the ring gear and the sun gear such that the gears operate as a planetary gearset in a known manner. For example, in the configuration shown, the ring gear is rotationally fixed to the axle housing and does not rotate so that, when the sun gear is rotated, the planetary carrier rotates at a slower speed to provide additional torque to output shaft 210.

As shown in the single FIGURE, ring gear 112 is a separate component fixed in housing portion 110 (e.g., via a spline connection, cutting spline, welding, etc.) and axially retained in housing portion 110 by snap ring 120. However, other embodiments (not shown) may include the ring gear integrally formed with housing portion 110 from a same piece of material. For example, the housing portion may be a forged and machined component including the ring gear teeth. The output hub may be formed in a similar manner, with separate planet gear shafts and/or a yoke (discussed below) fixed to hub base 122, or the components may be formed integrally from a single piece of material.

Output hub 114 includes yoke 124 arranged for receiving cross 212 of a universal joint to rotationally fix the output hub to output shaft 210. That is, the output hub includes a yoke and the output shaft includes yoke 214, and cross 212 is assembled with the yokes to form a universal joint in a known manner. The universal joint transmits torque from the output hub to the output shaft when the two are misaligned (i.e., not coaxial). Universal joints are commonly used for steer axles of four-wheel-drive (4WD) vehicles to permit steering while still transmitting torque. Although a universal joint is shown, other embodiments (not shown) may include a hub with a grooved cup arranged for receiving balls to form a constant velocity (CV) joint together with the output shaft. Such an arrangement is common in a front axle of front-wheel-drive (FWD) and all-wheel-drive (AWD) vehicles.

Planetary inner knuckle 100 includes axial bearing 126 supporting the sun gear on housing portion 110 and axial bearing 128 supporting the sun gear on the planetary carrier. Bearings 126 and 128 maintain axial alignment of the ring gear and sun gear relative to the pinion gears, and provide axial thrust support for the planetary carrier through to the axle housing. Planetary inner knuckle 100 also includes housing portion 130 fixed to housing portion 110 and arranged to receive ball joint 216 for steering knuckle 218. In the embodiment shown, housing portion 130 is bolted to housing portion 110, although other embodiments are possible. For example portions 110 and 130 may be welded together, staked together or joined together with adhesives.

Housing portion 130 is sealed to output hub 114 via seal 132. Similarly, housing portion 110 is sealed to axle shaft 204 via seal 220. In the embodiment shown, housing portion 110 is fixed (and sealed) to axle housing 202 as described above, and the axle housing is sealed to the axle shaft. Other embodiments (not shown) may include housing portion 110 extending radially inwards and sealing directly to the axle shaft, however. Seals 132 and 220 may be lip seals, for example, that seal a chamber in housing 102 for retaining a lubricant for the planetary inner knuckle. Housing portion 130 is arranged to receive ball joint 222 for steering knuckle 218. That is, ball joints 216 and 222 are fixed in housing portion 130 and secured to the steering knuckle in a known manner. The ball joints are arranged coaxially so that the steering knuckle pivots easily. The steering knuckle supports the output shaft and, when the steering knuckle is pivoted relative to housing 102, the universal joint (or CV joint) allows torque transmission through the misaligned shafts.

Vehicle axle 200 includes axle housing 202, axle shaft 204 extending through the axle housing, output shaft 210, arranged for fixing to a wheel (not shown) for the vehicle, and planetary knuckle 100. Output shaft 210 includes drive hub 224 fixed to wheel hub 226 (e.g., via bolts 228) so that torque from the output shaft is transferred to the wheel (not shown) via the wheel hub. Steering knuckle 218 includes spindle 230 and wheel hub 226 is rotatably mounted on the spindle via wheel bearing 232. In the embodiment shown, wheel bearing 232 is a double-row tapered roller bearing but other embodiments may include a different style of wheel bearing (e.g., a double-row or triple-row ball bearing). Threaded spindle nut 234 secures bearing 232 on spindle 230.

Seal 236 seals the drive hub to the wheel hub, seal 238 seals the wheel hub to the bearing (e.g. bearing inner race 240) and seal 242 seals the bearing (e.g., inner race 240) to the spindle. In the embodiment shown, seal 238 is a lip seal and seals 236 and 242 are o-ring seals, although other embodiments may include other seal types. Similar to seals 132 and 220 described above, seals 236, 238 and 242 seal a chamber in wheel hub 226 for retaining a lubricant for wheel bearing 232. The wheel (not shown) may be mounted on wheel studs 244, fixed to the wheel hub.

As described above, planetary knuckle 100 includes housing 102 with housing portion 110 fixed to axle housing 202 and ring gear 112 rotationally fixed to the axle housing (e.g., through housing portion 110). Knuckle 100 also includes sun gear 104 rotationally fixed to axle shaft 204 and planetary carrier 106 with output hub 114, coaxial with the axle shaft and rotationally fixed to the output shaft, and planet gear shafts 116. Planet gears 108 are each mounted a planet gear shaft and drivingly engaged with the ring gear and the sun gear. Although only two planet gears and planet gear shafts are shown in the cross-section, the planetary knuckle may include up to six planet gears intermeshed with the ring gear and the sun gear.

Axle 200 includes cross 212 of a universal joint, with two pairs of coaxial shafts. Output hub 114 includes yoke 124 and one of the pairs of coaxial shafts are rotatably fixed in the first yoke. By rotatably fixed, we mean that the shafts are fixed in the yoke but freely rotatable (e.g., via needle bearings) about their centerline in a known manner. Similarly, output shaft 210 includes yoke 214 and the other pair of coaxial shafts is rotatably fixed in the second yoke. Ball joints 216 and 222 are fixed to housing portion 130 and steering knuckle 218 is rotatably fixed to the ball joints. Axle 200 also includes seal 220 for sealing the axle shaft to the axle housing (or housing 102) and seal 132 for sealing the housing to the output hub.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Planetary inner knuckle
102 Housing (planetary inner knuckle)
104 Sun gear
106 Planetary carrier
108 Planet gears
110 Housing portion (first, housing 102)
112 Ring gear
114 Output hub
116 Planet gear shafts
118 Bearings (planet gears)
120 Snap ring (first housing portion)
122 Hub base
124 Yoke (first, output hub)
126 Axial bearing (first)
128 Axial bearing (second)
130 Housing portion (second)
132 Seal (housing to output hub)
200 Vehicle axle
202 Housing (axle)
204 Axle shaft
206 Spline connection (sun gear to axle shaft)
208 Snap ring (axle shaft)
210 Output shaft
212 Cross (universal joint)
214 Yoke (second, output shaft)
216 Ball joint (first)
218 Steering knuckle
220 Seal (axle shaft to axle housing)
222 Ball joint (second)
224 Drive hub
226 Wheel hub
228 Bolts (drive hub to wheel hub)
230 Spindle
232 Wheel bearing
234 Threaded spindle nut
236 Seal (drive hub to wheel hub)
238 Seal (wheel hub to bearing)
240 Bearing inner race
242 Seal (bearing to spindle)
244 Wheel studs

What is claimed is:

1. A planetary inner knuckle for a vehicle axle, comprising:
 a housing comprising:
  a first housing portion arranged for fixing to a housing for the vehicle axle; and
  a ring gear, rotationally fixed to the housing for the vehicle axle;
 a sun gear arranged for rotationally fixing to an axle shaft for the vehicle axle;
 a planetary carrier comprising:
  an output hub arranged to be coaxial with the axle shaft and arranged for rotationally fixing to an output shaft that is pivotable relative to the axle shaft; and
  a plurality of planet gear shafts; and
 a plurality of planet gears, each mounted on a one of the plurality of planet gear shafts and drivingly engaged with the ring gear and the sun gear,
 wherein the output hub comprises a yoke arranged for receiving a cross of a universal joint to rotationally fix the output hub to the output shaft.

2. The planetary inner knuckle of claim 1 wherein the ring gear is:
 a separate component fixed in the first housing portion; or integrally formed with the first housing portion from a same piece of material.

3. The planetary inner knuckle of claim 1 further comprising:
 a first axial bearing supporting the sun gear on the first housing portion; and
 a second axial bearing supporting the sun gear on the planetary carrier.

4. The planetary inner knuckle of claim 1 further comprising a second housing portion fixed to the first housing portion and arranged to receive a first ball joint for a steering knuckle.

5. The planetary inner knuckle of claim 4 wherein the second housing portion is bolted to the first housing portion.

6. The planetary inner knuckle of claim 4 wherein the second housing portion is sealed to the output hub.

7. The planetary inner knuckle of claim 4 wherein the second housing portion is arranged to receive a second ball joint for the steering knuckle.

8. A vehicle axle for a vehicle, the vehicle axle comprising:
 an axle housing;
 an axle shaft extending through the axle housing;
 an output shaft arranged for fixing to a wheel for the vehicle; and
 a planetary knuckle comprising:
  a housing comprising:
   a first housing portion fixed to the axle housing; and
   a ring gear rotationally fixed to the axle housing;
  a sun gear rotationally fixed to the axle shaft;
  a planetary carrier comprising:
   an output hub coaxial with the axle shaft and rotationally fixed to the output shaft;
   wherein, the output hub comprises a first yoke; and
   a plurality of planet gear shafts; and
  a plurality of planet gears, each mounted on a one of the plurality of planet gear shafts and drivingly engaged with the ring gear and the sun gear.

9. The vehicle axle of claim 8 further comprising a cross of a universal joint, the cross comprising two pairs of coaxial shafts, wherein:
 a first pair of the two pairs of coaxial shafts is rotatably fixed in the first yoke;
 the output shaft comprises a second yoke; and
 a second pair of the two pairs of coaxial shafts is rotatably fixed in the second yoke.

10. The vehicle axle of claim 8 further comprising a first ball joint, wherein:
 the housing further comprises a second housing portion fixed to the first housing portion; and
 the first ball joint is fixed in the second housing portion.

11. The vehicle axle of claim 10 further comprising:
a second ball joint fixed in the second housing portion; and
a steering knuckle rotatably fixed to the first ball joint and the second ball joint.

12. The vehicle axle of claim 8 further comprising:
a first seal for sealing the axle shaft to the axle housing or the housing; and
a second seal for sealing the housing to the output hub.

* * * * *